J. R. BARNES.
HOLDER FOR LIGHTED CIGARS.
APPLICATION FILED MAY 17, 1911.
1,017,197.
Patented Feb. 13, 1912.
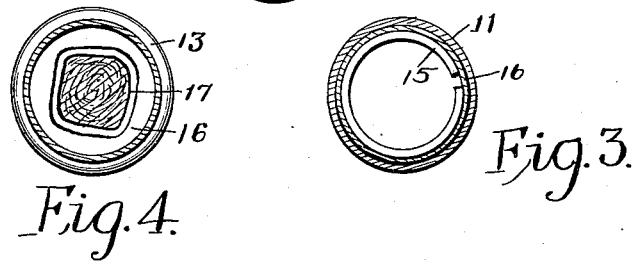
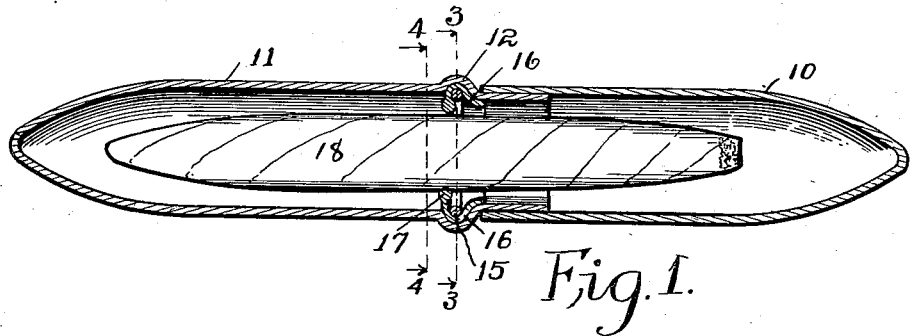
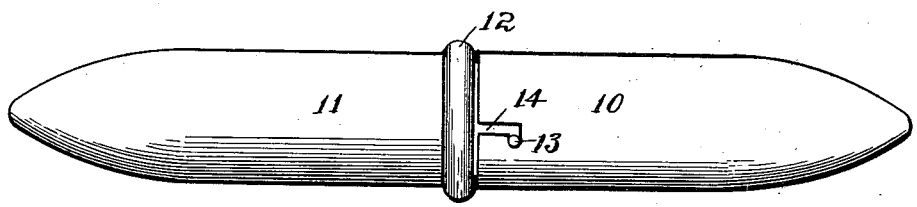
Witnesses
A. G. Hague
W. A. Loftus
Inventor
John R. Barnes
by J. Ralph L. Dwight

UNITED STATES PATENT OFFICE.

JOHN R. BARNES, OF OSKALOOSA, IOWA.

HOLDER FOR LIGHTED CIGARS.

1,017,197. Specification of Letters Patent. Patented Feb. 13, 1912.

Application filed May 17, 1911. Serial No. 627,843.

*To all whom it may concern:*

Be it known that I, JOHN R. BARNES, a citizen of the United States, residing at Oskaloosa, in the county of Mahaska and State of Iowa, have invented a certain new and useful Holder for Lighted Cigars, of which the following is a specification.

The object of my device is to provide a metal case for holding lighted cigars when the holder desires to place the same in his pocket temporarily.

A further object is to provide means in such a device whereby the lighted end of the cigar is held away from contact with the case of said holder, so that the holder may not become heated.

My invention consists in the construction, arrangement and combination of the various parts of the device whereby the objects contemplated are attained, as hereinafter set forth, pointed out in my claims, and illustrated in the accompanying drawings, in which—

Figure 1 shows a longitudinal sectional view of a cigar holder embodying my invention with a cigar contained therein. Fig. 2 shows a side elevation of my improved holder. Fig. 3 shows a transverse, sectional view on the line 3—3 of Fig. 1. Fig. 4 shows a transverse, sectional view on the line 4—4 of Fig. 1, and Fig. 5 shows a detail view of the ring by which the retaining device is held in position in the holder.

My device is composed of two cylindrical members 10 and 11 each of which has one end closed. The closed ends of the members 10 and 11 are preferably made in conical shape. The open end of the member 10 is of sufficient diameter to slidingly receive the open end of the member 11 as clearly shown in Figs. 1 and 2. Near the free end of the member 11 is formed an outwardly extending groove 12 running circumferentially around the member 11. The groove 12 serves a double purpose. It limits the reception of the free end of the member 11 into the free end of the member 10. It also serves to hold and retain the ring 15 hereinafter described. Near the free ends of the members 10 and 11 is formed a bayonet joint in which the lug or post 13 is located on the section 11 and is received in the slot 14 in the member 10. Received within the groove 12 is a section of a ring 15. When the ends of the ring section 15 are together the circumference of the ring is less than the inner circumference of the groove 12. The ring section 15 is normally of larger diameter than the groove 12, and when inserted in said groove its resiliency holds it in close engagement therewith. Between the ring section 15 and the member 10 is placed a resilient receiving device preferably of rubber which in its normal form is a tube, one end of which is directed slightly inwardly, so that the diameter of that end is smaller than the diameter of the main body of the tube. The smaller end of this tube 16 is preferably reinforced by a resilient band 17. In the construction of the tube 16 and the band 17, I preferably use rubber, the band 17 being preferably reinforced rubber cord. The ring section 15 is inserted in the tube 16 and is located at a point spaced apart from the band 17. The ring section 15 inclosed in the tube 16 is then placed in the groove 12. The diameter of the smaller end of the tube 16 is less when the tube is in position in the holder, than the diameter of any ordinary cigar.

In practical use, when a smoker desires to put away a cigar which has been lighted, he may insert the unlighted end of the same into the end of the member 10. The cigar which is indicated by the reference numeral 18 is received by the resilient band 17 and the lighted end is thereby held against contact with the member 10 which receives the end of the member 11 as shown in Fig. 1. It will thus be seen that by the use of my improved holder, a lighted cigar may be wholly received within said holder and the holder placed in the pocket without any danger of burning the clothes of the user or causing him any inconvenience. The separation of the members 10 and 11 is prevented by the bayonet joint 14.

I claim as my invention:

1. A holder for lighted cigars, comprising two cylindrical members each of which is closed at one end, the free end of one of said members being slidingly received within the free end of the other of said members, an outwardly extending circumferential groove on one of said members near its free end, a rubber tube of substantially smaller diameter than said cylindrical members, a ring section of resilient metal normally greater in diameter than said cylindrical sections received in said rubber tube at a point spaced apart from one end thereof, said rubber tube and said ring section being received within one of said cylindrical members with said ring section in said groove, and means for securing said cylindrical members against disengagement with each other.

2. A holder for lighted cigars, comprising two cylindrical members each of which is closed at one end, the free end of one of said members being slidingly received within the free end of the other of said members, an outwardly extending circumferential groove on one of said members near its free end, a rubber tube of substantially smaller diameter than said cylindrical members, a reinforcing resilient band at one end of said rubber tube, a ring section of resilient metal normally greater in diameter than said cylindrical sections received in said rubber tube at a point spaced apart from said reinforcing band, said rubber tube and said ring section being received within one of said cylindrical members with said ring section in said groove, and means for securing said cylindrical members against disengagement with each other.

Des Moines, Iowa, April 11, 1911.

JOHN R. BARNES.

Witnesses:
  H. B. McCoy,
  E. A. Darnell.

---

Copies of this patent may be obtained for five cents each, by addressing the "Commissioner of Patents, Washington, D. C."